(12) United States Patent
Grennall et al.

(10) Patent No.: US 7,152,568 B2
(45) Date of Patent: Dec. 26, 2006

(54) INTERNAL COMBUSTION ENGINE

(75) Inventors: Darren J. Grennall, Horton Kirby (GB); John Rowley, Hertfordshire (GB); Paul N. Turner, Chelmsford (GB); Derek Banks, Kent (GB); Mark Fowler, Chelmsford (GB); Mark Danby, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 11/018,179

(22) Filed: Dec. 21, 2004

(65) Prior Publication Data

US 2005/0139185 A1    Jun. 30, 2005

(51) Int. Cl.
*F16C 9/02* (2006.01)
*F02F 7/00* (2006.01)

(52) U.S. Cl. .................................. 123/195 R
(58) Field of Classification Search ............. 123/195 R
See application file for complete search history.

(56) References Cited

U.S. PATENT DOCUMENTS

| | | | | |
|---|---|---|---|---|
| 3,046,954 A | * | 7/1962 | Hoffman et al. ............ | 92/149 |
| 5,222,467 A | * | 6/1993 | Sasada ..................... | 123/195 H |
| 5,509,387 A | * | 4/1996 | Kaminski et al. ........ | 123/195 R |
| 6,070,562 A | * | 6/2000 | Van Bezeij ............. | 123/195 R |
| 6,471,406 B1 | * | 10/2002 | Cadle et al. ................ | 384/433 |
| 6,543,405 B1 | * | 4/2003 | Sachdev et al. ........ | 123/195 R |
| 6,626,576 B1 | * | 9/2003 | Cadle et al. ................ | 384/273 |

FOREIGN PATENT DOCUMENTS

| | | |
|---|---|---|
| DE | 1268901 | 5/1968 |
| DE | 19645691 A1 | 5/1998 |
| DE | 19949928 A1 | 4/2001 |
| GB | 1265781 | 3/1972 |
| JP | 61127915 A * | 6/1986 |
| JP | 62-96714 | 5/1987 |
| JP | 10-196635 | 7/1998 |
| WO | WO 00/22290 | 4/2000 |

* cited by examiner

*Primary Examiner*—Marguerite McMahon
(74) *Attorney, Agent, or Firm*—Diana D. Brehob

(57) ABSTRACT

A cylinder block for an internal combustion engine which, in use, supports a rotary crankshaft 40, the block having pairs of opposed lock width surfaces 37 formed thereon for forming an interference fit with respective co-operating lock width surfaces 38 on the crankshaft bearing caps 34 which in use are secured to respective bearing cap support surfaces 36 also formed on the block 31. The lock width surfaces 37, 38 are spaced from the respective bearing cap support surfaces 36 so as to improve stress cracking resistance of the block 31.

10 Claims, 2 Drawing Sheets

INTERNAL COMBUSTION ENGINE

FIELD OF THE INVENTION

This invention relates to internal combustion engines and in particular to the mounting of the crankshaft for rotation within the cylinder block of an engine

BACKGROUND AND SUMMARY

In a typical internal combustion engine the engine crankshaft is mounted for rotation in bearings mounted on the cylinder block. The bearings are typically split with one half of the bearing supported in the cylinder block and the other half of the bearing supported in a bearing cap mounted to the cylinder block. The bearing caps retain and locate the crankshaft, or bearings for a crankshaft shaft which in turn retain and locate the shaft, relative to a cylinder block. The journal bearings on the crankshaft run against the two half shell bearings which are fitted to the main bearing cap and semi-circular surfaces on internal supporting walls of the block. For vibration free, low friction and quiet running, the roundness of the bore produced by the main bearing cap and the bulkhead is very important. This roundness is achieved by a machining operation called line boring. The main bearing caps are bolted to the internal supporting walls and then all the circular bearing surfaces are machined in a single operation. This ensures the two half rounds formed by the main bearing cap and the bearing block form as near to a perfect circle as possible and that all the circular bearings are coaxial. The bearing surfaces may then be honed to a fine finish to achieve the extremely fine tolerances needed for quiet running and efficient engine performance.

However, to install the crankshaft, it is necessary to remove the main bearing caps from the engine block. After the crankshaft is put in place, it is necessary to reposition the main bearing caps so that they are replaced in the identical position they occupied during the line boring operation. Any deviation from that original position produces an out-of-round condition that, in turn, leads to vibration, noise and possibly stiff, high friction crankshaft operation and rapid wear. There are a number of conventional methods for relocating and attaching the main bearing caps to bulkheads when installing the crankshaft. In one such method the main bearing cap has a very precisely machined dimension across the transverse axis (that is normal to the rotational axis of the crankshaft journal) of the main bearing cap across the foot of the bearing cap adjacent the bearing split line. This dimension is known as a lock width or snap width. A pair of cooperating opposing surfaces are precision machined on pads on the engine block support wall to produce a controlled interference fit with the cap when the main bearing cap is refitted after crankshaft installation.

The location in the fore and aft direction (i.e., in the direction of the rotational axis of the crankshaft journal) may be controlled by the bearing cap bolts or the use of hollow dowels pressed into counter-based holes in the support wall. The dowels then locate in precisely machined counter-bores in the corresponding main bearing cap.

The interference fit between the main bearings caps and pads on the engine block cause some stresses to both the cap and the cylinder block. The machined pad surfaces and the machined clamping surface for the mounting cap on the support wall are substantially normal to each other and meet at a relatively sharp line of intersection. The lock width pads are subject to high compressive forces during the fitting of the main bearing cap and during operation of an engine, loads generated by combustion will also be transferred to the lock width pads.

The present invention provides a cylinder block in which the stresses caused by the lock width for the main bearing caps are reduced increasing the durability of the engine.

According to a first aspect of the present invention there is provided a cylinder block for an internal combustion engine, the cylinder block in use supporting a rotary crankshaft, the block having pairs of opposed lock width surfaces formed on the block for forming an interference fit with respective co-operating lock width surfaces on the crankshaft bearing caps which in use are secured to respective bearing cap support surfaces also formed on the block, wherein the lock width surfaces are spaced apart from the respective bearing cap support surfaces.

The lock width surfaces spaced from each respective bearing cap support surface such that a portion of the lock width surface in use aligns with the apex of the bearing cavity in the cap and preferably the mid height of the lock surface is at a distance from the bearing cap support surface substantially equal to the radius of the crankshaft bearing.

The lock width surfaces on the block may also be displaced relative to the end of the bearing cap mounting surface (that is radial with respect the axis of rotation of the crankshaft).

The cylinder block may be cast from any suitable material, such as cast iron or aluminium, and is particularly advantageous for materials which have a high notch sensitivity such as compacted graphite iron (CGI).

According to a second aspect of the invention there is also provided an internal combustion engine having a cylinder block according to a first aspect of the invention with a crankshaft rotationally mounted in bearings on the cylinder block, at least some of said bearings comprise two half bearings with one half of each bearing being on the block and the other half thereof being on a respective bearing cap mounted to the respective bearing cap support surface, each bearing cap having spaced apart lock-width surfaces thereon which form an interference fit with the respective co-operating lock width surfaces on the block.

The total interference fit is preferably in the order of 10–200 microns per bearing cap.

Each bearing cap comprises a body having limbs passing on each side of a semi-circular half bearing cavity and has mounting surfaces on the ends of each limb that sit against the support surface on the block, the outer end portions of each limb (that is outwardly from the crankshaft) adjacent the mounting surfaces having clearance with respect to the block.

Preferably each bearing cap is secured on the support surface bolts vertically (that is normal) to the support surface, and by cross-bolts (that is bolts parallel to the support surface) that engage with opposite outer sides of the bearing cap.

Conveniently, each cross bolt engages with a raised pad on the outer side of each limb.

Preferably the lock width surfaces are formed on the two cross bolt pads.

In the preferred arrangement, the crankshaft runs against the two half shell bearings which are fitted to the main bearing cap and semi-circular surfaces on internal supporting walls of the block.

The invention also comprises a motor vehicle having an engine according to the second aspect of the present invention.

BRIEF DESCRIPTION OF THE DRAWINGS

The invention will be described by way of example and with reference to the accompanying drawings in which.

DETAILED DESCRIPTION

Figure 1:
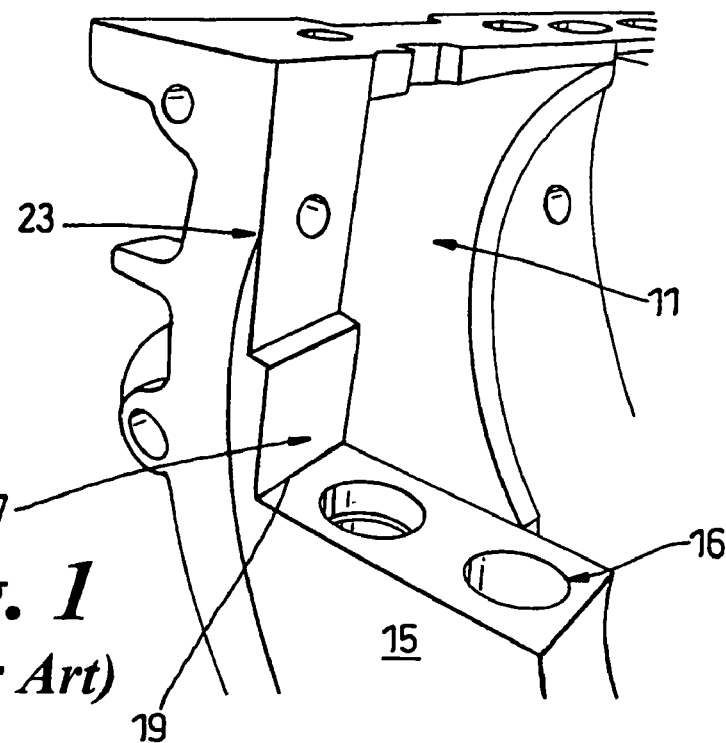
FIG. 1 shows a prior art cylinder bock.
Figure 2:
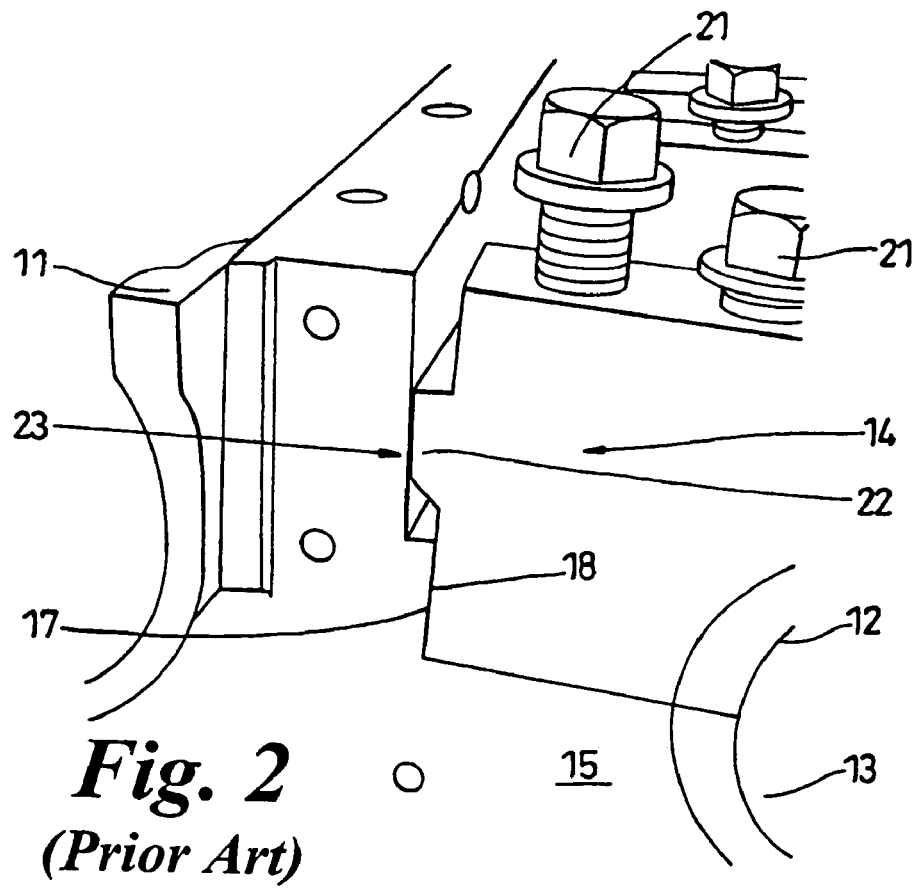
FIG. 2 shows the prior art cylinder block with main cap bearing.

FIGS. 1 and 2 show the prior art in which a cylinder block 11 supports a rotatable crankshaft (not shown) on two half bearing shells 12 and 13 supported on a main bearing cap 14 and a wall 15 of the block 11. The wall 15 has a main bearing cap support surface 16 formed thereon and the cylinder block 15 has a pair of precisely machined opposing lock width surfaces 17 formed thereon adjacent the end of the support surface 16.

The bearing cap 14 has a pair of lock width surfaces 18 precisely machined thereon that in use co-operate with the surfaces 17 on the block to precisely locate the main bearing cap 14. The bearing cap 14 is secured in position by vertical bolts 21 and cross bolts (not shown) which screw into a raised pad 22 on the side of the bearing cap. The cross bolt pads 22 are machined to always be in clearance with machined location surfaces 23 on the block so that the lock width always provides the interference between the bearing cap 14 and the block 11.

The line of intersection 19 between each lock surface 17 and the support surface 16 acts as a stress raiser due to the compressive forces resulting from the interference fit of the cap 14 between the two surfaces 17.

Figure 3:
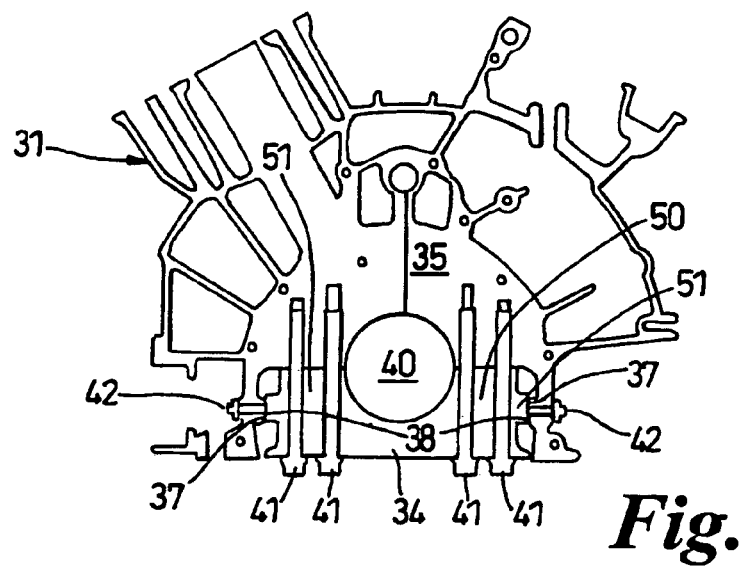
FIG. 3 is a sectional view of a cylinder block according to the present invention with the main bearing cap in situ.
Figure 4:
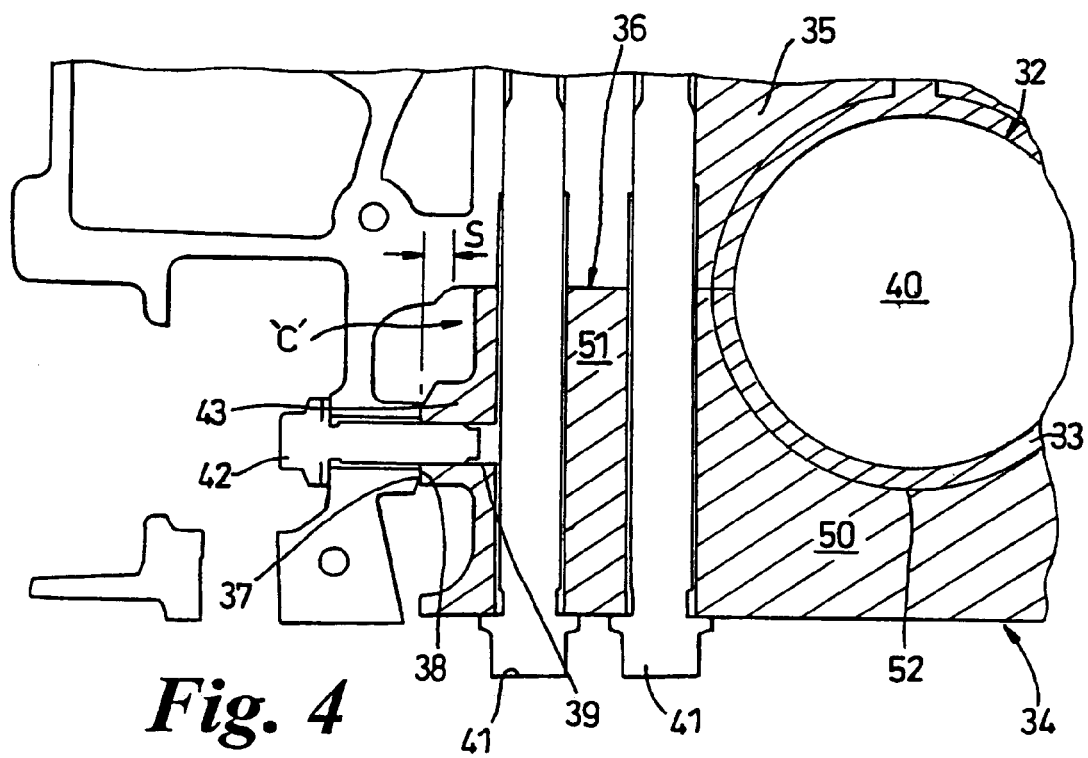
FIG. 4 is an enlarged view of a portion of the cylinder block and bearing cap.

With reference to FIGS. 3 and 4, there is shown a cylinder block 31 having walls 35 which in use support the journals 40 of a crankshaft mounted for rotation relative to the block using bearing caps 34. In the present example the block is for a V 6 configuration internal combustion engine but the invention is applicable to other engine types. The cylinder block is cast from CGI and machined in the conventional manner.

The invention will be described with reference only to a single wall and bearing cap as shown in FIG. 3. The crankshaft rotates in a pair of half bearing shells 32, 33 mounted in the cylinder block wall 35 and bearing cap 34. The bearing cap 34 comprises a body 50 having limbs 51 passing on each side of a semi-circular half bearing cavity 52 in which the half bearing shell 33 is accommodated. The limbs 51 have mounting surfaces on the ends of each limb that sit against a support surface 36 machined on the block 31. The outer end portions of each limb 51 (that is outwardly from the crankshaft) adjacent the mounting surfaces have a clearance C with respect to the block.

The bearing cap 34 is secured to the support surface 36 by vertical bolts 41, preferably four bolts, and preferably two opposing cross-bolts 42. The vertical bolts resist the high compressive forces generated by combustion in the cylinders and the cross bolts 42 prevent the cap 34 from twisting axially with the crankshaft (axially means along the axis of rotation of the crankshaft).

CGI, from which the cylinder is cast, has increased strength and stiffness as compared with conventional cast iron and better withstands the increased combustion pressures required by modern diesel engines in particular. However, CGI is sensitive to stress cracking and to reduce the stress concentrations, the lock width surfaces 37 on the cylinder block are moved away from the support surface 36, which is known as the split line. The two lock width surfaces 37 on the block 31 align with co-operating lock width surfaces 38 on the bearing cap 34 which are machined on raised pads 43 on the outer side of the limbs 51 of the bearing cap. The lock width surfaces 37 on the block do not align with and are radially spaced from the end of the machined support surface 36 by a gap S. The lock width interference is between 10–200 microns and preferably 20 to 100 microns.

In the preferred arrangement, the lock widths 37, 38 are spaced from the split line 36 such that portions of the lock width surfaces are in alignment with the apex of the semi-circular cavity 52 and more preferably such that the mid-height of the lock width surfaces 37, 38 is spaced from the split line by a distance which approximates to the radius of the crank journal. In the present example for a 35 mm crank shaft, the lock width area extends vertically for about 13 to 15 mm and the mid height is about 30 mm from the split line. This mid-height will alter from between 25–45 mm depending on the diameter of the crankshaft to be supported by the bearing cap so that a portion of the lock width area overlaps with the apex of the cavity.

It is convenient if the cross-bolts 42 engage in threaded bores 39 which are formed in the lock width surfaces 38 in the centre of the lock width area.

The location of the lock width surfaces 37 & 38 away from the split line decreases the stress concentrations at the split line by a factor of two.

The invention claimed is:

1. A cylinder block for an internal combustion engine adapted to support a rotary crankshaft, comprising:
   bearing cap support surfaces formed on the block;
   crankshaft bearing caps adapted to be securable to said bearing cap support surfaces formed on the block, said crankshaft bearing caps having lock width surfaces; and
   pairs of opposed lock width surfaces formed on the block, said opposed lock width surfaces forming an interference fit with said lock width surfaces on said crankshaft bearing caps, wherein said lock width surfaces are spaced from the respective bearing cap support surfaces such that portions of the lock width surfaces are adapted to align with the apex of the crankshaft bearing cavity in the bearing cap.

2. The cylinder block as claimed in claim 1 wherein the lock width surface is spaced from the support surface such that its mid height is at a distance from the bearing cap support surface which approximates with the crankshaft bearing radius.

3. The cylinder block as claimed in claim 1 wherein the lock width surfaces on the block are displaced relative to the end of the bearing cap mounting surface.

4. The cylinder block as claimed in claim 1 wherein the cylinder block is cast from compacted graphite iron.

5. The cylinder block as claimed in claim 1, further comprising:
   a crankshaft rotationally mounted in bearings on the cylinder block, at least some of said bearings comprising two half bearings with one half of each bearing being on the block and the other half thereof being on a respective bearing cap mounted to a respective bearing cap support surface, and each bearing cap has spaced apart lock-width surfaces thereon which form an interference fit with the respective co-operating lock width surfaces on the block.

6. The cylinder block as claimed in claim 5 wherein the interference fit is between 20–100 microns per bearing cap.

7. The cylinder block as claimed in claim 5 wherein each bearing cap comprises a body having limbs passing on each side of a semi-circular half-bearing cavity and has mounting surfaces on the ends of each limb such that said mounting surfaces sit against a respective bearing cap support surface on the block, the outer end portions of each limb proximate the mounting surfaces have clearance with respect to adjacent portions of the block.

8. The cylinder block as claimed in claim 5 wherein each bearing cap is secured to its respective support surface by bolts normal to the support surface, and by bolts parallel to the support surface, the parallel bolts engaging with raised pads on opposite outer sides of the bearing cap.

9. The cylinder block as claimed in claim 8 wherein the lock width surfaces on the bearing caps are formed on the respective raised pads for the parallel bolts.

10. The cylinder block as claimed in claim 4 wherein the crankshaft runs against the two half shell bearings which are fitted one to the main bearing cap and one to semi-circular surfaces on internal supporting walls of the block.

* * * * *